United States Patent Office 3,736,273
Patented May 29, 1973

3,736,273
METHOD OF MAKING AN EXPANDABLE THERMOPLASTIC RESIN
Itaru Hatano, Kobe, and Hiroji Tsukamoto, Osaka, Japan, assignors to Kanegafuchi Kagaku Kogyo Kabushiki Kaisha, Osaka, Japan
No Drawing. Filed Dec. 29, 1969, Ser. No. 888,871
Int. Cl. C08j 1/16
U.S. Cl. 260—2.5 B      5 Claims

ABSTRACT OF THE DISCLOSURE

An expandable thermoplastic resin and a method of manufacturing the same which can considerably shorten the curing period and from which the cellular material foamed has a uniform cell size and a uniform cell distribution, comprising a thermoplastic resin, a metal salt of an aliphatic carboxylic acid or an aromatic carboxylic acid in an amount of 2% by weight or less of said thermoplastic resin, the metal of said metal salt belonging to Group II of the periodic table and a gaseous expanding agent.

---

The present invention relates to an expandable thermoplastic resin and a method of manufacturing the same.

Conventional expandable resins prepared by using expanding agents which are in liquid or gaseous states under normal conditions have various faults. That is, such expandable resins cannot be used without being aged or cured for a considerably long period of time after the production thereof. When a so-called uncured resin is expanded or foamed by heating, the size and the distribution of cells in the cellular material obtained are not uniform. Also, when a gaseous expanding agent is employed, the expansibility of the expanding agent is severely reduced as the elapse of time. On the other hand, when a liquid expanding agent is employed, the period of time required for curing the expandable resin becomes longer. Moreover, the fault common to the both cases of using the liquid expanding agent and using the gaseous expanding agent is that when a cured expandable resin is transferred to a place having different conditions than those of curing the resin, the cured resin is converted into the original uncured resin.

An object of the present invention is to provide an expanable thermoplastic resin without showing the aforesaid faults.

Other object of this invention is to provide a method of manufacturing such improved expandable thermoplastic resin.

Thus, according to the present invention, there is provided a homogeneous expandable thermoplastic resin comprising a thermoplastic resin having incorporated therein a metal salt of an aliphatic carboxylic acid or an aromatic carboxylic acid, the metal of said metal salt belonging to Group II of the periodic table, and a gaseous expanding agent. The present invention will be explained in detail hereinafter.

In the present invention any thermoplastic resins may be used as the base resin for the expandable thermoplastic resin of this invention but styrenic resins may preferably used. Examples of such styrenic resins used preferably in the present invention are homo-polymers or co-polymers of styrene, α-methylstyrene, vinyltoluene, parachlorostyrene or derivatives of them. Other examples of the styrenic resins used in the present invention are co-polymers of an predominant amount of at least one aforesaid styrenic monomer and other monomers such as acrylonitrile, an acrylic ester, a methacrylic ester, vinylpyridine, vinylcarbazole, and the like. Furthermore, the styrenic resins used in the present invention may be homogeneous composition of the aforesaid styrenic resins and other resins.

The expanding agents to be employed in the present invention are organic compounds which are in gaseous or liquid states under normal conditions. The preferable examples of the expanding agents are aliphatic hydrocarbons, halogenated aliphatic hydrocarbons, and alicyclic compounds each having boiling point lower than the softening points of the base resins as stated above. For example, they are propane, butane, isobutane, pentane, isopentane, neopentane, butene, ethyl chloride, methyl chloride and the like. Among them, however, gaseous compounds are more effective for the objects of the present invention. The selection of the kind of expanding agent depends upon the kind and properties of the thermoplastic resin to be employed, the presence of absence of additives, etc., but the expanding agent shall have a boiling point lower than the softening point of the thermoplastic resin. The aforesaid expanding agents may be used alone or in combination of two or more of them. Also, the proportion of the expanding agent may be 15% by weight or less of the thermoplastic resin to be employed as in conventional cases.

The metal salts used in the present invention are the salts of aliphatic carboxylic acids or aromatic carboxylic acids and the metals belonging to Group II of the periodic table. For the metal salts, any kinds of aliphatic carboxylic acids may be employed but such aliphatic carboxylic acids having 25 or less carbon atoms are preferably used in the present invention. The practical examples of the aliphatic carboxylic acids are stearic acid, palmitic acid, myristic acid, lauric acid, oleic acid and the like. Also, any aromatic carboxylic acids may be used but the preferable examples of the aromatic carboxylic acids in the present invention are alkylbenzoic acids such as cuminic acid, n-butylbenzoic acid, tert-butylbenzoic acid, etc.; alkylphthalic acids; alkyl derivatives of 1,2- or 2,3-naphthalic acid; alkylnaphthalene-carboxylic acids; naphthaleneacetic acid; and the like. As the metals belonging to Group II of the periodic table, there are illustrated calcium, strontium, barium, zinc, cadmium, and the like. In particular, in the case of using the metal salts of the aromatic carboxylic acids, zinc and cadmium are preferable as the metals, while in the case of using the metal salts of the aliphatic carboxylic acids, calcium is preferable. These metal salts may be used alone or in combination of two or more of them. The proportion of the metal salts may be 2% by weight or less of the expandable thermoplastic resin of the invention since even if the proportion of its is increased over 2% by weight, the effect thereof is not further increased in proportion to the increased amount.

The expandable thermoplastic resin of the present invention is a homogeneous composition of the above-mentioned base thermoplastic resin, the expanding agent, and the metal salt.

The expandable thermoplastic resin of the present invention may be prepared by an ordinary manner. For example, in the case of preparing the base thermoplastic resin by an aqueous suspension polymerization of monomers (including a suspension polymerization of monomers after a part of which have been subjected to a bulk polymerization and a suspension polymerization of monomers having dissolved therein polymers), the metal salt is added to the polymerization system. The metal salt may be added in any step, that is, it may be added to the polymerization system at the beginning of or during the polymerization. It is preferable that the metal salt is added until the conversion ratio of polymerization reaches about 60%. In this case, it is desirable to employ the metal salt as a solution or dispersion thereof in monomers. The expanding agent may be added to the system during the polymerization thereof or after conducting the polymerization of monomers without adding the expanding agent, the thermoplastic resin thus obtained may be impregnated by the expanding agent. The impregnation of the expanding agent may be conducted in an ordinary manner. Also, the impregnation may be carried out in the presence of a small amount of a solvent for the base resin. As the solvent, for example, toluene, benzene, tetrachloroethylene, etc., may be preferably used when a styrene resin is employed as the base resin. The use of such a solvent is effective for impregnating rapidly the base resin with the expanding agent.

The merits of the present invention are illustrated as follows:

(1) The curing period of time for the expandable thermoplastic resin can be largely shortened. For example, the granular expandable thermoplastic resin immediately after the preparation thereof can be subjected to an expansion molding by using a mold.

(2) The cellular material obtained by foaming the expandable thermoplastic resin of this invention immediately after the preparation thereof has a uniform cell diameter and a uniform cell distribution as compared with conventional articles.

(3) The expansibility of the expandable thermoplastic resin is very stable or less reduced when the resin is stored for a long period of time.

(4) Even if the storing conditions for the expandable thermoplastic resin of the present invention are changed, the cellular state of the cellular material is scarcely changed. That is, the expandable thermoplastic resin of the present invention is not converted into the state of the uncured expandable thermoplastic resin as prepared by a conventional method.

(5) The expansibility of the expandable thermoplastic resin of the present invention is higher than that of conventional ones when the same amount of expanding agent is employed.

These facts were confirmed by the following experiments:

An aqueous polymerization system consisting of 100 parts by weight of styrene having dissolved therein benzoyl peroxide as a catalyst, 0.5 part by weight of the metal salts described in the below-showing table, and the small amount of sodium nitrite was subjected to a suspension polymerization and when the ratio of polymerization reached 80%, 12 parts by weight of butane was pressed in the system and thereafter the polymerization was terminated to provide expandable resin beads of 10–20 meshes (Tyler—hereinafter the same) in size.

As the contrast, expandable resin beads having the same size as above were also prepared by repeating the same suspension polymerization as above with the exception that the metal salt was not used. About 5.7% by weight of the expanding agent were included in any beads.

The expandable resin beads of this invention and the contrast were foamed by using steam at 100° C. for 5 minutes, the results are shown in Table 1 and Table 2, in which the evaluations of the cells in the cellular materials were made by the following three grades.

Cell size (a): invisible by the naked eye; (b): visible by the naked eyes; (c): very gross.

Uniformity of cell size (a'): uniform; (b'): nearly uniform; (c'): not uniform.

Cell distribution (a''): uniform; (b''): nearly uniform; (c'') not uniform.

TABLE 1.—COMPARISON OF CURING PERIOD AND CELL STATES

| | | Present invention | |
|---|---|---|---|
| Metal salt | Contrast, not added | Calcium stearate | Cadmium tert-butyl benzoate |
| Curing period | Longer than 1 month | 10 days | 7 days |
| State of cell: | | | |
| Immediately after preparation | c, c', c'' | a, a', a'' | a, a', a'' |
| Open (3 days at 30° C.) | c, c', c'' | a, b', b'' | a, b', b'' |
| Change of cell states by temp. change: | | | |
| Close (7° C.) Open (24 hrs. at 30° C.) | c, c', c'' | a, b', b'' | a, b', b'' |
| Close (23° C.) Open (24 hrs., at 30° C.) | b–c, c', c'' | a, a'–b', a''–b'' | a, a'–b', a''–b'' |

TABLE 2.—REDUCTION IN DEGREE OF EXPANSION OF EXPANDABLE POLYSTYRENE BEADS AS THE ELAPSE OF TIME

| Expandable beads | Contrast | | Calcium stearate | | Cadmium tertbutyl benzoate | |
|---|---|---|---|---|---|---|
| Immediately after preparation | 630 | (100%) | 700 | (100%) | 740 | (100%) |
| Open: | | | | | | |
| 1 week at 30° C | 540 | (86%) | 620 | (89%) | 670 | (90%) |
| 2 weeks at 30° C | 450 | (71%) | 550 | (79%) | 610 | (82%) |
| 3 weeks at 30° C | 410 | (65%) | 510 | (73%) | 570 | (77%) |

NOTE.—Degree of expansion: cc./10 g.

Now, the invention will be explained practically by referring the following examples.

EXAMPLE 1

An aqueous polymerization system consisting of 24 kg. of water containing a small proportion of polyvinyl alcohol and sodium nitrite and 15 kg. of styrene having incorporated therein a small proportion of benzoyl peroxide and butyl perbenzoate and 45 g. of calcium stearate was polymerized by heating for 6 hours at 90° C. in a nitrogen atmosphere. Then, after adding 3500 cc. of butane to the system, the mixture was heated to 96° C. for one hour and after maintaining it for 6 hours at 96° C., the product was cooled and withdrawn. The product was then dried to provide expandable polystyrene beads having uniformly dispersed expanding agent and metal salt throughout the resin.

When the expandable polystyrene beads thus prepared were foamed by heating immediately after the preparation thereof, the states of cell were (a), (a'), and (a'') according to the above-mentioned grades. Furthermore, when the expandable polystyrene beads were allowed to stand for 3 days at temperatures lower than 30° C. and thereafter expanded by steam for 5 minutes, the degree of expansion was 850 cc./10 g. in the beads of 7–10 meshes and 720 cc./10 g. in the beads of 10–20 meshes.

On the other hand, contrast polystyrene beads prepared by the same procedure as above except that no calcium stearate was employed were cured by allowing to stand for 40 days at 30° C. in air and then foamed by the same manner but the states of cells in the cellular material thus prepared were (b), (c') and (b'') and could not practically be used as cellular article. The degree of expansion of the contrast was 750 cc./10 g. in the beads of 7–10 meshes and 620 cc./10 g. in the beads of 10–20 meshes.

EXAMPLE 2

An aqueous polymerization system consisting of 800 g. of water containing polyvinyl alcohol, 450 g. of styrene containing 0.3% by weight of calcium stearate, and a polymerization catalyst was polymerized for 6 hours at 90° C. Then, after maintaining the system for 3 hours at 96° C. and then for 2 hours at 98° C., the product beads formed were dried.

The polymer beads of 10–20 meshes in size were selected from the beads thus formed were charged in an ampule together with water in an amount of twice as large as that of the beads and 12% by weight of butane, and the mixture was shaken for 6 hours at 90° C.

The expandable polystyrene beads thus obtained were placed in a vessel and after closing the vessel, the beads were maintained for 4 days at 23° C. and then foamed. The states of cells in the cellular material thus obtained were (a), (a'), and (a''). Also, when the expandable polystyrene beads were allowed to stand for 24 hours at 30° C. in air and then expanded, the states of the cells in the cellular material were also (a), (a'), and (a'').

EXAMPLE 3

An aqueous polymerization system consisting of 100 parts by weight of styrene, 160 parts by weight of water, 0.3 part by weight of benzoyl peroxide, 0.04 part by weight of butyl perbenzoate, 0.005 part by weight of sodium nitrite, and a small amount of polyvinyl alcohol was subejected to suspension polymerization at 90° C. After 2 hours, a small amount of polyvinylpyrrolidone was added to the system and further after 10 minutes, 0.3 part by weight of calcium palmitate and 5 parts by weight of styrene were added. The system was further polymerized for 7 hours at 90° C. and for 5 hours at 98° C. The resin beads thus prepared were recovered and dried.

A mixture of 40 g. of the resin bead prepared above, 70 g. of water and 5 g. of butane was shaked in a closed system for 7 hours at 90° C. and the expandable polystyrene beads were withdrawn.

When the polymer beads were expanded by heating immediately after the preparation of them, the states of cells in the cellular material were (a), (a'), and (a'').

EXAMPLE 4

A mixture of 95 parts by weight of styrene, 5 parts by weight of methyl methacrylate, 170 parts by weight of water, 0.3 part by weight of benzoyl peroxide, and 0.2 part by weight of tert-butyl perbenzoic was mixed with 15 parts by weight of benzene and 0.3 part by weight of calcium laurate with stirring and the resultant polymerization ssytem was polymerized for 6 hours at 90° C. and then for 5 hours at 100° C.

After drying, 100 parts by weight of the copolymer beads thus formed were mixed with 14 parts by weight of butane, 200 parts by weight of water, and 0.3 part by weight of polyvinyl alcohol and the resultant mixture was heated to 90° C. to impregnate the copolymer beads with the expanding agent. The expandable beads thus prepared were expanded and the states of cells in the cellular material were (a), (a'), and (a'').

EXAMPLE 5

An aqueous polymerization system consisting of 24 kg. of water containing 15 g. of polyvinyl aloohol and 1.2 g. of sodium nitrite and 15 kg. of styrene containing 40 g. of benzoyl peroxide, 15 g. of tert-butyl perbenzoate and 75 g. of cadmium cuminate was polymerized by heating for 5 hours at 90° C. Thereafter, 30 g. of polyvinyl alcohol, 1500 g. of water and then 1500 cc. of butane were added to the system and further after 6 hours, 1500 cc. of butane was added to the system. Then, the resultant system was heated to 96° C., stirred for 6 hours at the same temperature, cooled, and the polymers beads were withdrawn, which were dried.

The expandable polymer beads thus formed were expanded by heating. The states of cells in the cross section of the cellular material were (a), (a'), and (a'') and the degree of expansion was 880 cc./10 g. in the beads of 7–10 meshes and 750 cc./10 g. in the beads of 10–20 meshes.

When the contrast sample was prepared under the same conditions except that no cadmium cuminate was used, the states of cells in the cellular material were (c), (c'), and (c'') and the degree of expansion was 780 cc./10 g. in the beads of 7–10 meshes and 650 cc./10 g. in the beads of 10–20 meshes.

EXAMPLE 6

An aqueous polymerization system consisting of 800 g. of water containing 0.1% by weight polyvinyl alcohol, 450 g. of styrene containing 0.5% by weight cadmium n-butylbenzoate, 30 g. of methyl methacrylate (styrene +methyl methacrylate 100% by weight), 15 g. of benzoyl peroxide, and 0.5 g. of tert-butylperbenzoate was polymerized for 6 hours at 90° C. and then for 6 hours at 96° C. to provide copolymer beads, which were dried.

A mixture of 35 g. of the copolymer beads thus formed, water in the amount of twice as large as that of the beads, 0.3 g. of polyvinyl alcohol, 1 g. of pentane, and 2.4 g. of butane was charged in an ampule and the system was shaked for 6 hours at 90° C. to provide expandable copolymer beads, which were dried.

When the expandable beads thus formed were expanded, the states of cells in the cellular material were (a–b), (a'–b'), and a''–b''). On the other hand, when a contrast cellular sample was prepared by the same procedure as above except that no cadmium n-butylbenzoate was used, the states of cells in the cellular material were (b), (b'–c'), and (b''–c'').

EXAMPLE 7

A mixture of 90 parts by weight of styrene, 10 parts by weight of polystyrene, 0.27 part by weight of benzoyl peroxide, 0.3 part by weight of tert-butylperbenzoate, and 0.5 part by weight of zinc p-tert-butylbenzoate was dispersed in 160 parts by weight of water having dissolved therein 0.0063 part by weight of polyvinyl alcohol, 0.1 parts by weight of polyvinyl pyrrolidone, and 0.004 part by weight of sodium nitrite and the resultant system was polymerized for 6 hours at 90° C. and then 6 hours at 96° C. with stirring.

A dispersion of 100 parts by weight of the polymer beads thus obtained in 200 parts by weight of water containing 0.3 part by weight of polyvinyl alcohol was mixed with 14 parts by weight of butane. The resultant system was shaked for 7 hours at 90° C. and cooled to provide expandable polymer beads.

The expandable beads were dried by air at room temperature and after drying, expanded immediately in steam at 100° C. into 60 times the volume of the original beads.

The states of cells in the cross section of the cellular material thus formed were (a), (a'), and (a''), while the states of cells in a contrast sample prepared by the same procedure as above without using the metal salt were (b–c), (b'–c'), and (b''–c'').

EXAMPLE 8

An aqueous system consisting of 100 parts by weight of styrene, 0.5 part hy weight of a polyoxyethylene alkyl ether series surface active agent, 0.7 part by weight of sodium chloride, 0.007 part by weight of polyvinyl alcohol, 0.004 part by weight of sodium nitrite, and 160 parts by weight of water polymerized at 90° C. and then 10 parts by weight of water having dissolved therein 0.04 part by weight of a copolymer of methylvinyl ester and maleic anhydride was added to the system. After 280 minutes from the start of polymerization, 10 parts by weight of water containing 0.3 part by weight of polyvinyl alcohol was added and then after 30 minutes, 12 parts by weight of butane was added to the system. After 30 minutes from the addition of butane, the temperature of the polymerization system was raised to 96° C. The polymerization system was maintained at the same temperature for 360 minutes and thereafter the resin beads formed were recovered.

When the expandable resin beads were expanded by heating to provide a cellular material, the states of cells in the cellular material were (a), (a'), and (a''). On the other hand, the states of cells in a control cellular material prepared by the same procedure as above except that no zinc tert-butylbenzoate was used were (c), (c′), and (c″).

EXAMPLE 9

In a vessel were charged 100 parts by weight of styrene, 0.3 part by weight of benzoyl peroxide, 0.2 part by weight of tert-butylperbenzoate, 0.5 part by weight of zinc naphthaleneacetate, 0.2 part by weight of calcium stearate, and 160 parts by weight of water containing a dispersing agent, and the polymerization system was subjected to suspension-polymerization for 6 hours at 90° C. and for 4 hours at 96° C. Thereafter, a mixture of 100 parts by weight of the polymer beads thus obtained, 200 parts by weight of water containing 0.3 part by weight of polyvinyl alcohol, 13 parts by weight of butane, and 1.2 parts by weight of tetrachloroethylene was shaken for 6 hours at 96° C.

When the expandable polymer beads formed were dried and expanded by heating, the states of cells in the cellular material were (a), (a′), and (a″).

What we claim is:

1. Method of producing a uniform homogeneous composition of expandable styrenic resin beads, comprising the steps of polymerizing vinylic monomers selected from the group consisting of (1) styrenic monomers selected from the group consisting of (a) styrene, (b) alpha-methylstyrene, (c) parachlorostyrene, and (d) derivative thereof, and (2) a monomer mixture of said styrenic monomers in a predominant amount with comonomers selected from the group consisting of (1) acrylonitrile, (2) acrylic ester, (3) methacrylic ester, (4) vinyl pyridine and (5) vinylcarbazole, in an aqueous suspension and in the presence of a metal salt of an aliphatic carboxylic acid or an aromatic carboxylic acid, in an amount of 2% by weight or less of said vinylic monomers; said metal of said metal salt belonging to Group II of the Periodic Chart; said aliphatic carboxylic acid being selected from the group consisting of (1) stearic acid, (2) palmitic acid, (3) myristic acid, (4) lauric acid and (5) oleic acid; and including an expanding agent during or after the polymerization process, said expanding agent being gaseous under normal conditions.

2. Method of claim 1, wherein said metal salt is added at the beginning or during the polymerization and until the conversion ratio reaches 60%.

3. Method of claim 1, wherein said expanding agent is up to 15% by weight of said resin.

4. The method as claimed in claim 1 wherein said aromatic carboxylic acid is cumic acid, n-butyl benzoic acid, tertbutyl benzoic acid, an alkyl phthalic acid, an alkyl derivative of 1,2-naphthalic acid or 2,3-naphthalic acid, an alkylnaphthalene carboxylic acid, or naphthalene acetic acid.

5. The method as claimed in claim 1 wherein said expanding agent is an aliphatic hydrocarbon, a halogenated aliphatic hydrocarbon, or an alicyclic compound.

References Cited

UNITED STATES PATENTS

| 2,857,341 | 10/1958 | Colwell et al. | 260—2.5 B |
| 3,468,828 | 9/1969 | Perrins et al. | 260—93.5 W |
| 3,068,192 | 12/1962 | White | 260—93.5 W |
| 2,668,806 | 2/1954 | Haward et al. | 260—93.5 W |
| 3,043,817 | 7/1962 | Jahn et al. | 260—93.5 W |
| 3,428,579 | 2/1969 | Stahnecker et al. | 260—2.5 B |
| 2,857,341 | 10/1958 | Colwell et al. | 260—2.5 B |

JOHN C. BLEUTGE, Primary Examiner

M. FOELAK, Assistant Examiner

U.S. Cl. X.R.

260—235, 886